United States Patent
Kido

(10) Patent No.: US 6,357,617 B1
(45) Date of Patent: *Mar. 19, 2002

(54) HOLLOW RESIN CONTAINER

(75) Inventor: Katsuyuki Kido, Seto (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,765

(22) Filed: Dec. 4, 1998

(30) Foreign Application Priority Data

Jan. 13, 1998 (JP) .......................... 10-004586

(51) Int. Cl.$^7$ ................................ F17C 3/12
(52) U.S. Cl. ..................... 220/562; 220/86.2
(58) Field of Search ................ 220/562, 900, 220/86.2, 62.22, 86.3, FOR 166, 661, 567.3, 917, DIG. 33; 16/2.1; 285/204, 205, 192, 194, 139.1, 139.2, 55

(56) References Cited

U.S. PATENT DOCUMENTS

| | | | | |
|---|---|---|---|---|
| 2,039,009 A | * | 4/1936 | Lampman et al. ......... 16/2.1 X |
| 2,987,216 A | * | 6/1961 | Fletcher ...................... 220/295 |
| 3,086,679 A | * | 4/1963 | Bijvoet ................. 220/62.22 X |
| 3,449,182 A | * | 6/1969 | Wiltshire ............. 220/62.22 X |
| 3,506,155 A | * | 4/1970 | Auer ......................... 220/86.2 |
| 3,756,367 A | * | 9/1973 | Mitchell et al. ............. 188/352 |
| 3,912,107 A | * | 10/1975 | Baumann ............. 220/62.22 X |
| 4,336,291 A | | 6/1982 | Broadhurst et al. |
| 4,394,925 A | * | 7/1983 | Rump et al. ................ 220/86.2 |
| 4,501,374 A | * | 2/1985 | Robertson ................... 220/86.2 |
| 4,741,457 A | * | 5/1988 | Joseph et al. ............. 220/62.22 |
| 4,760,858 A | * | 8/1988 | Szlaga .................. 220/86.2 X |
| 4,887,851 A | * | 12/1989 | Rush et al. ............. 285/197 X |
| 4,915,249 A | * | 4/1990 | Anhegger et al. ......... 220/86.1 |
| 4,993,579 A | * | 2/1991 | Burchett ................ 220/495.05 |
| 5,022,495 A | * | 6/1991 | Lavender ............... 220/86.2 X |
| 5,165,749 A | * | 11/1992 | Sheppard ............... 220/86.2 X |
| 5,344,038 A | * | 9/1994 | Freeman et al. ......... 220/62.22 |
| 5,466,016 A | * | 11/1995 | Briody et al. ............... 285/204 |
| 5,547,096 A | * | 8/1996 | Kleyn .................... 220/562 X |
| 5,589,241 A | * | 12/1996 | Stiles et al. .......... 220/62.22 X |
| 5,765,713 A | * | 6/1998 | Geisheker et al. .......... 220/562 |
| 5,913,451 A | * | 6/1999 | Madison ................ 220/900 X |
| 6,051,795 A | * | 4/2000 | Flsher et al. ............. 174/153 G |

FOREIGN PATENT DOCUMENTS

| EP | 288 587 | | 11/1988 | |
|---|---|---|---|---|
| EP | 504 558 A2 | | 9/1992 | |
| FR | 818225 | * | 9/1937 | ............. 220/63 |
| JP | 55-110433 | | 1/1979 | |
| JP | 58-202112 | | 11/1983 | |
| JP | 63-258750 | | 10/1988 | |

OTHER PUBLICATIONS

Patent Abstracts of Japan, vol. 008, No. 047 (M–280), Mar. 2, 1984 & JP 58 202112 A (Toyota Jidosha Kogyo KK), Nov. 25, 1983.

* cited by examiner

Primary Examiner—Lee Young
Assistant Examiner—Joseph C. Merek
(74) Attorney, Agent, or Firm—Pillsbury Winthrop LLP

(57) ABSTRACT

In a hollow resin container, a seal portion is formed substantially at as center of a portion at which an inlet hose and a part attachment portion of a resin layer are overlapped. A gas barrier sheet extends to a region further toward an outer side of the hollow resin container than the seal portion. Accordingly, there is no region of the inner side surface of the part attachment portion which is not covered by the gas barrier sheet. Thus, sealability at the part attachment portion, which serves as a portion for attaching the inlet hose, can improve.

4 Claims, 6 Drawing Sheets

HOLLOW RESIN CONTAINER

BACKGROUND OF THE INVENTION

1. Field of the Invention

The present invention relates to a hollow resin container, such as a fuel tank or the like, which is provided in an automobile.

2. Description of the Related Art

FIG. 6 shows an example of a hollow resin container, such as a fuel tank, which is provided in an automobile. In this fuel tank 100, a gas barrier sheet 104 serving as a sheet material for preventing permeation of gasoline is provided on a matrix resin layer 102 at the inner side of the tank 100.

However, in the conventional fuel tank 100 (hollow resin container), the inner surface of a part attachment portion 108, to which an external part such as an inlet hose 106 or the like can be attached, is not covered with the gas barrier sheet 104 from the viewpoint of improving moldability. In other words, cut end portions 104A of the gas barrier sheet 104 are provided at a base end portion 108A of the part attachment portion 108 which is formed integrally with the resin layer 102. Usually, a seal portion 110 for preventing leakage of liquid is formed at the part attachment portion 108 which connects the fuel tank 100 (hollow resin container) and the external part such as the inlet hose 106 or the like. However, in this conventional example, a region 112, at which the gas barrier sheet 104 does not exist, is formed between the seal portion 110 and the base end portion 108A of the part attachment portion 108. Accordingly, sealability in this region is low.

SUMMARY OF THE INVENTION

With the aforementioned in view, an object of the present invention is to obtain a hollow resin container which can improve sealability at a part attachment portion, to which a part which is outside of the container can be attached.

The present invention is a hollow resin container which is formed from a resin, the inner surface of the hollow resin container being covered by a sheet material, and the hollow resin container having a part attachment portion to which an external part can be attached, wherein: the sheet material extends to a region further toward an opening end side of the part attachment portion than a seal portion, which is formed by the part attachment portion and the external part attached to the part attachment portion.

In the present invention, the inner surface of the part attachment portion of the hollow resin container is covered by the sheet material to a region further toward an opening end side of the part attachment portion than a seal portion, which is formed by the part attachment portion and the external part attached to the part attachment portion. Therefore, sealability at the part attachment portion is excellent.

DESCRIPTION OF THE PREFERRED EMBODIMENTS

A hollow resin container (e.g., an automobile fuel tank) relating to a first embodiment of the present invention will be explained in detail in accordance with FIGS. 1 and 2.

Figure 2:
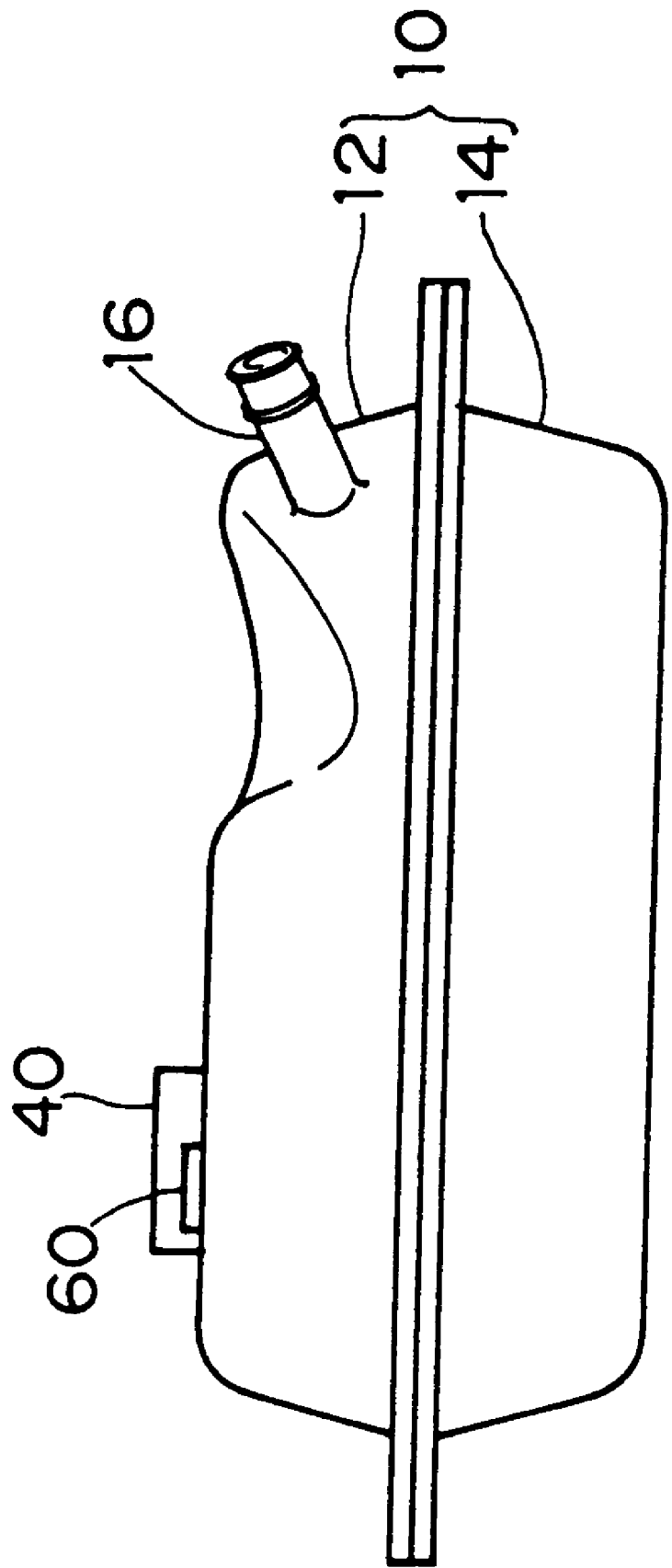
FIG. 2 is a side view which shows the hollow resin container of the first embodiment of the present invention.

As shown in FIG. 2, a fuel tank 10 of the first embodiment comprises a fuel tank upper 12 and a fuel tank lower 14. A part attachment portion, to which an inlet hose 16 can be attached, is provided at the upper portion of the fuel tank upper 12, and the inlet hose 16 is connected to the part attachment portion. The inlet hose 16 is an external part for injecting fuel into the fuel tank 10.

Figure 1:
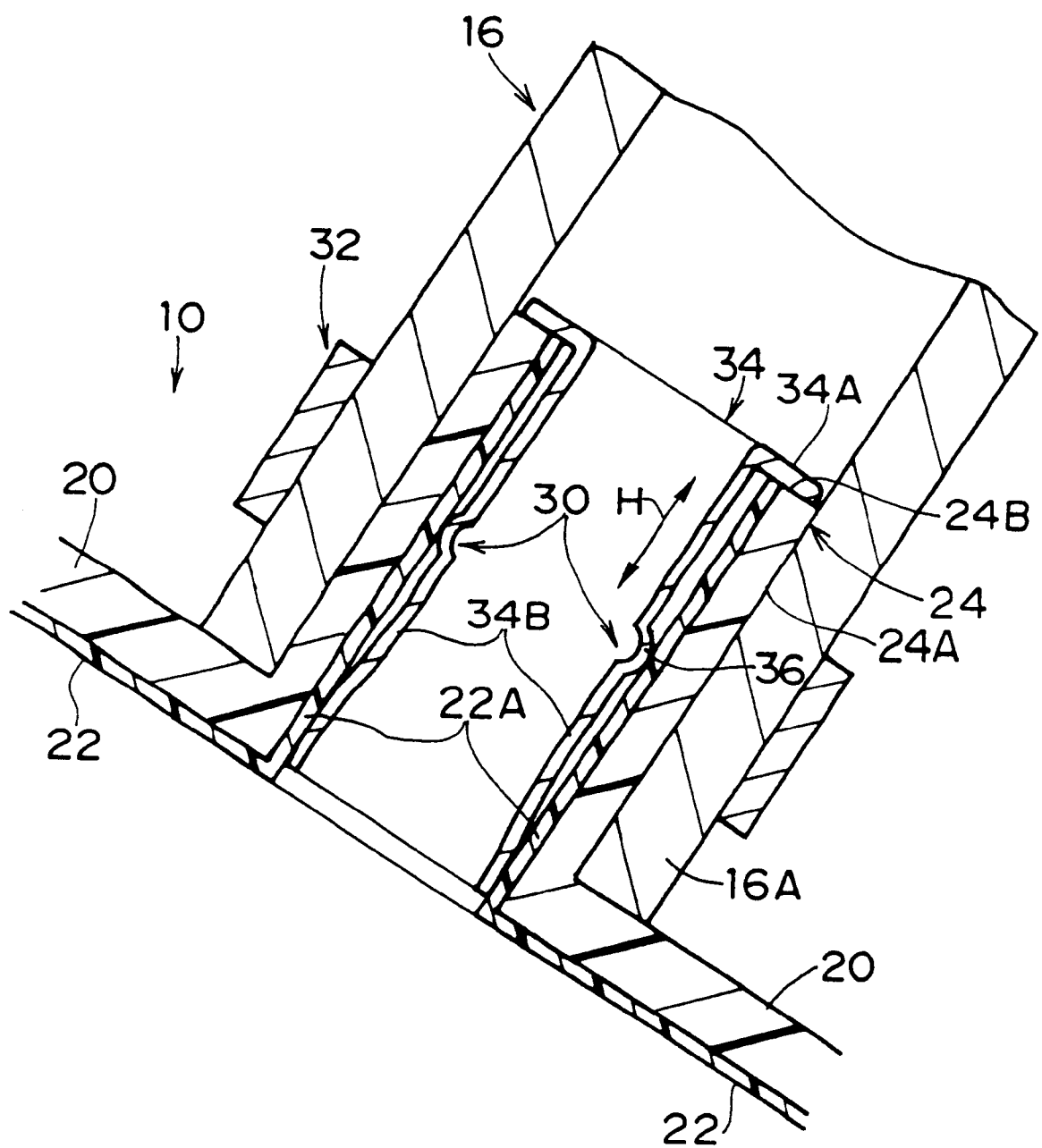
FIG. 1 is a side cross-sectional view which shows an inlet hose attachment portion at a hollow resin container of a first embodiment of the present invention.

As shown in FIG. 1, the fuel tank 10 is formed by a matrix resin layer 20 and a gas barrier sheet 22 serving as a sheet material. The gas barrier sheet 22 covers the fuel tank 10 inner side surface of the matrix resin layer 20.

The gas barrier sheet 22 has a laminated structure in which a gas barrier layer having the ability to prevent the permeation of gas is disposed between resin layers which are formed of the same resin as the matrix resin layer 20 of the hollow resin container. The gas barrier layer is also referred to as a gas permeation resistant layer and is formed from ethylene-vinyl alcohol (EVOH) or the like. The resin layers are formed from a resin which is the same resin as the matrix resin (e.g., polyethylene resin) of the hollow resin container. The gas permeation resistance of the gas barrier sheet 22 is improved by the gas barrier layer, and the gas barrier sheet 22 fits more closely to the matrix of the hollow resin container due to the resin layer.

At the portion for connecting with the inlet hose 16, i.e., at the part attachment portion to which the inlet hose 16 can be attached, a cylindrical part attachment portion 24 is protruded from the matrix resin layer 20, and a lower end opening portion 16A of the inlet hose 16 is fit on an outer circumferential portion 24A of the part attachment portion 24. The inner circumferential surface of the part attachment portion 24 of the resin layer 20 is covered with the gas barrier sheet 22. (Hereinafter, the portion of the gas barrier sheet 22 which covers this inner circumferential surface is referred to as "gas barrier sheet 22A".)

A seal portion 30 is provided substantially at the center of a portion, at which the inlet hose 16 and the part attachment portion 24 of the resin layer 20 are overlapped, in the depth direction (the direction of arrow H in FIG. 1). At this seal portion 30, a ring-shaped clamp 32 made of a metal is provided at the outer circumferential portion of the inlet hose 16. Further, a collar 34 is inserted into the inner circumferential portion of the part attachment portion 24 of the resin layer 20 from the opening portion side of the part attachment portion 24, and a flange 34A, which is formed at one opening end of this collar 34, abuts an opening end portion 24B of the part attachment portion 24. A pipe-shaped portion 34B of the collar 34 is provided over substantially the entire length of the part attachment portion 24 of the resin layer 20. At the seal portion 30, a convex portion 36 whose cross-sectional configuration is semicircular is formed in a ring-shape at the outer circumferential portion of the pipe-shaped portion 34B. Namely, at the seal portion 30, the inlet hose 16, the part attachment portion 24 of the resin layer 20, and the gas barrier sheet 22A are nipped between the convex portion 36 of the collar 34 and the inner circumferential surface of the clamp 32. Accordingly, leakage of liquid does not occur.

Next, operation of the first embodiment will be explained.

As shown in FIG. 1, in the first embodiment, at the part attachment portion 24 to which the inlet hose 16 can be attached, at the resin layer 20 of the fuel tank 10, the seal portion 30 is formed substantially at the depth direction center of the portion at which the inlet hose 16 and the part attachment portion 24 of the resin layer 20 are overlapped. The gas barrier sheet 22A extends from this seal portion 30 to a region which is outside of the fuel tank 10, i.e., the opening end of the part attachment portion 24.

Figure 6:
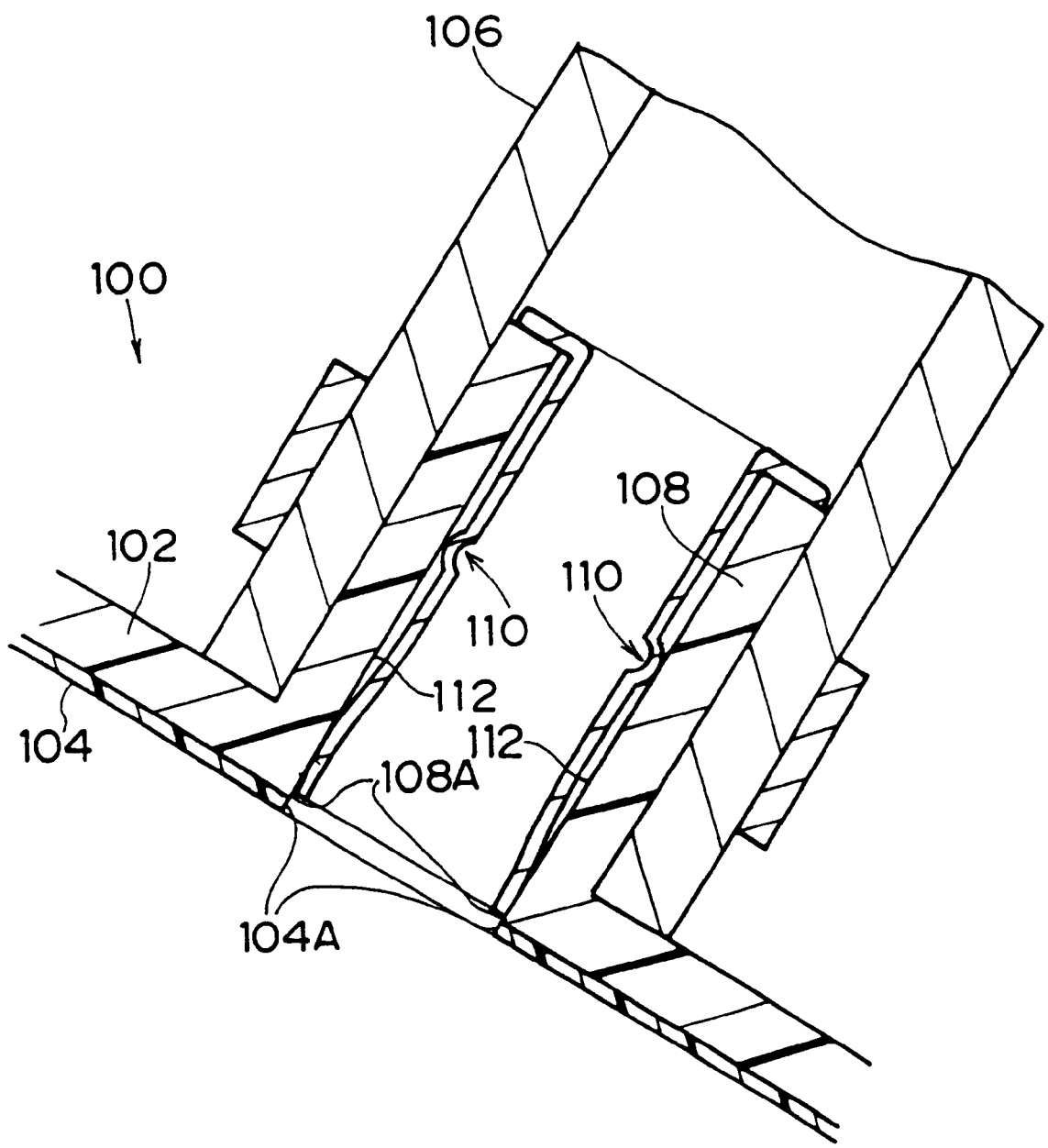
FIG. 6 is a side cross-sectional view which shows an inlet hose attachment portion at a conventional hollow resin container.

Therefore, in the fuel tank 10 of the first embodiment, unlike the structure illustrated in FIG. 6, there is no region of the inner side surface of the part attachment portion 24 of the resin layer 20 which is not covered by the gas barrier sheet 22. Therefore, sealability at the part attachment portion 24 can improve.

Next, a hollow resin container relating to a second embodiment of the present invention will be explained in detail in accordance with FIGS. 3 and 4.

Members which are the same as those in the first embodiment are denoted by the same reference numerals, and descriptions thereof are omitted.

Figure 4:
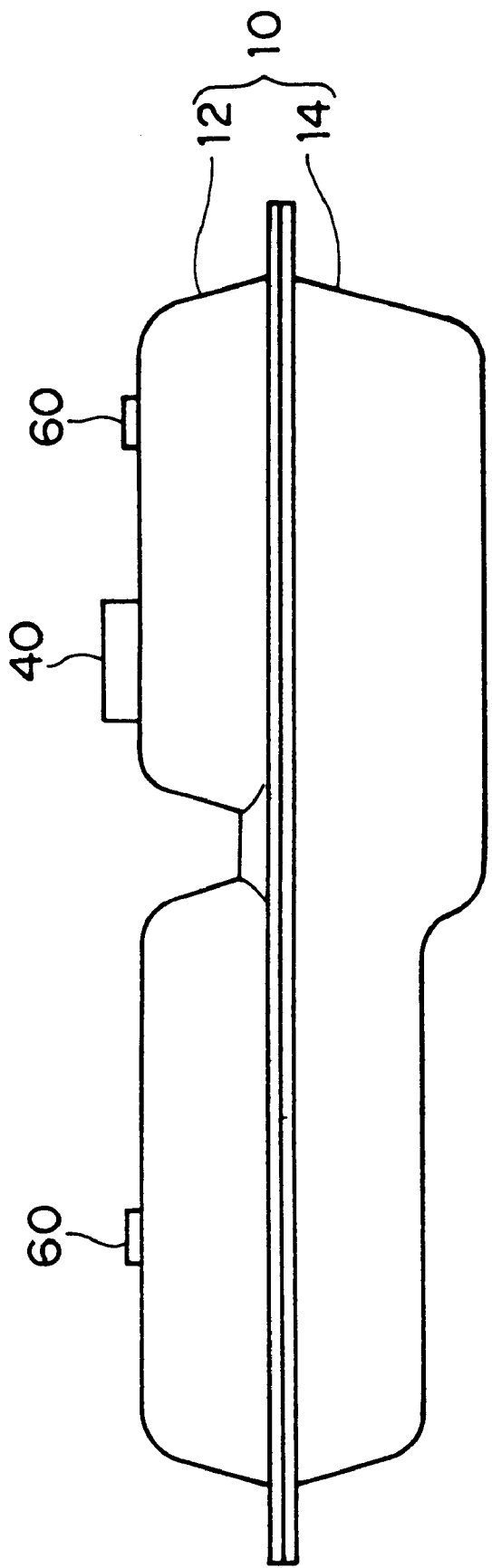
FIG. 4 is a front view which shows the hollow resin container of the second embodiment of the present invention.

As shown in FIG. 4, a pump assembly 40, which is a part attached from outside, is mounted on the upper portion of the fuel tank 10 of the second embodiment in order to supply fuel to an engine.

Figure 3:
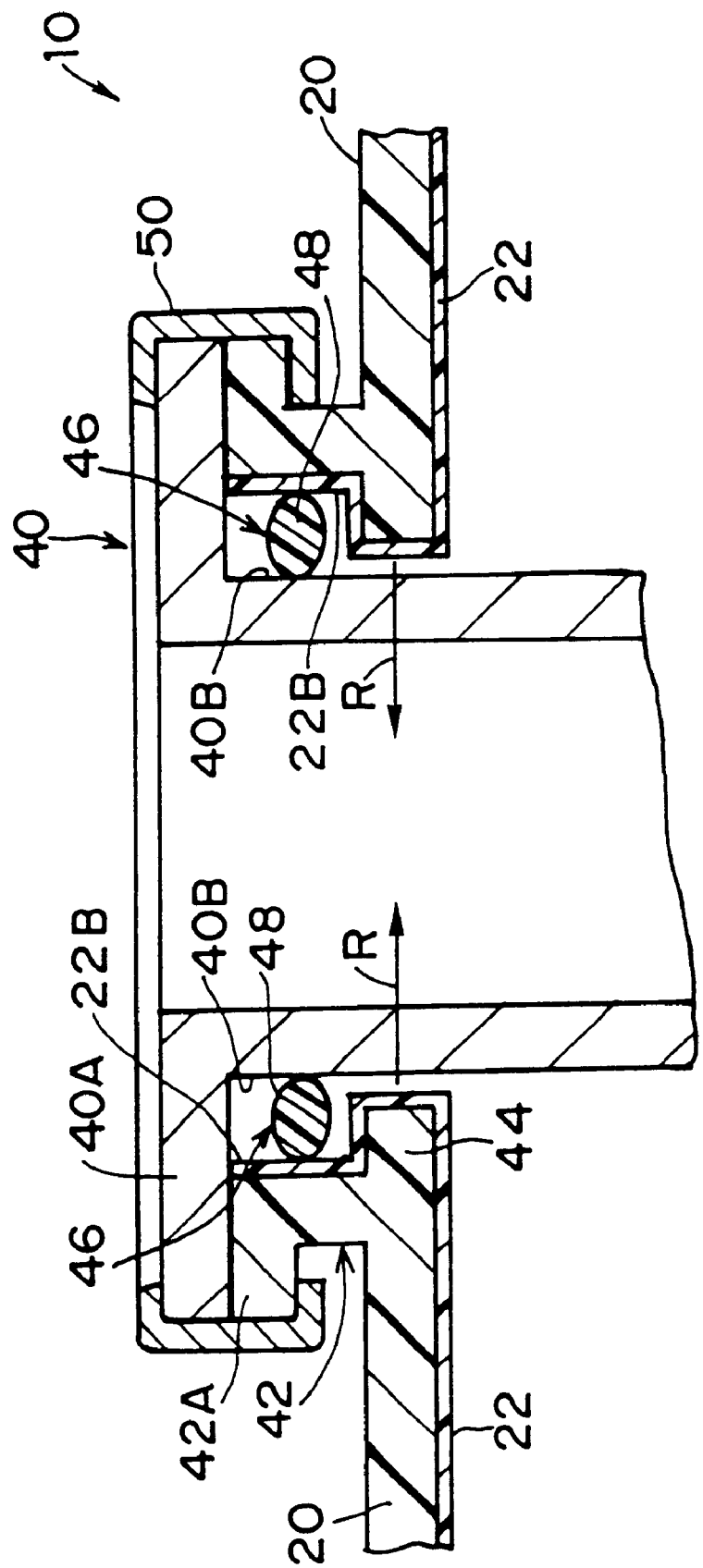
FIG. 3 is a side cross-sectional view which shows a pump assembly attachment portion at a hollow resin container of a second embodiment of the present invention.

As shown in FIG. 3, a flange 40A is formed outwardly at the upper end opening portion of the pump assembly 40. Further, at a portion connecting with the pump assembly 40, a cylindrical part attachment portion 42 is formed so as to protrude from the matrix resin layer 20. A flange 42A is formed outwardly at the distal end portion of the part attachment portion 42, and the flange 40A of the pump assembly 40 abuts this flange 42A. The flange 42A of the part attachment portion 42 and the flange 40A of the pump assembly 40 are connected by a retainer 50, whose cross-sectional configuration is U-shaped and which is wound around and attached to the outer circumferential portions of the flanges 40A and 42A. Moreover, at a base portion of the part attachment portion 42 of the resin layer 20, a ring-shaped convex portion 44 is formed inwardly (i.e., in the directions of arrow R in FIG. 3) in the radial direction of the part attachment portion 42. The gas barrier sheet 22 at the part attachment portion 42 extends to the opening end portion of the part attachment portion 42 along the inner surface thereof. (The portion of the gas barrier sheet 22 which extends upwardly from the convex portion 44 of the part attachment portion 42 of the resin layer 20 is referred to as "gas barrier sheet 22B".)

In the second embodiment, a seal portion 46 is formed at a region above the convex portion 44 of the part attachment portion 42 of the resin layer 20. In this seal portion 46, an O-ring 48 is inserted between a pipe-shaped portion 40B of the pump assembly 40 and the gas barrier sheet 22B. Accordingly, leakage of liquid does not occur.

Next, operation of the second embodiment will be explained.

As shown in FIG. 3, in the second embodiment, in the fuel tank 10, the seal portion 46 is formed at the region above the convex portion 44 of the part attachment portion 42 of the pump assembly 40. The gas barrier sheet 22B extends from the seal portion 46 to a region which is outside of the fuel tank 10, i.e., to the opening end of the part attachment portion 42.

Therefore, in the fuel tank 10 of the second embodiment, unlike the structure illustrated in FIG. 6, there is no region of the inner side surface of the part attachment portion 42 of the resin layer 20 at which the gas barrier sheet 22 does not exist. Therefore, sealability at the part attachment portion 42 can improve.

Next, a hollow resin container relating to a third embodiment of the present invention will be explained in detail in accordance with FIG. 5. Members which are the same as those in the first embodiment are denoted by the same reference numerals, and descriptions thereof are omitted.

Figure 5:
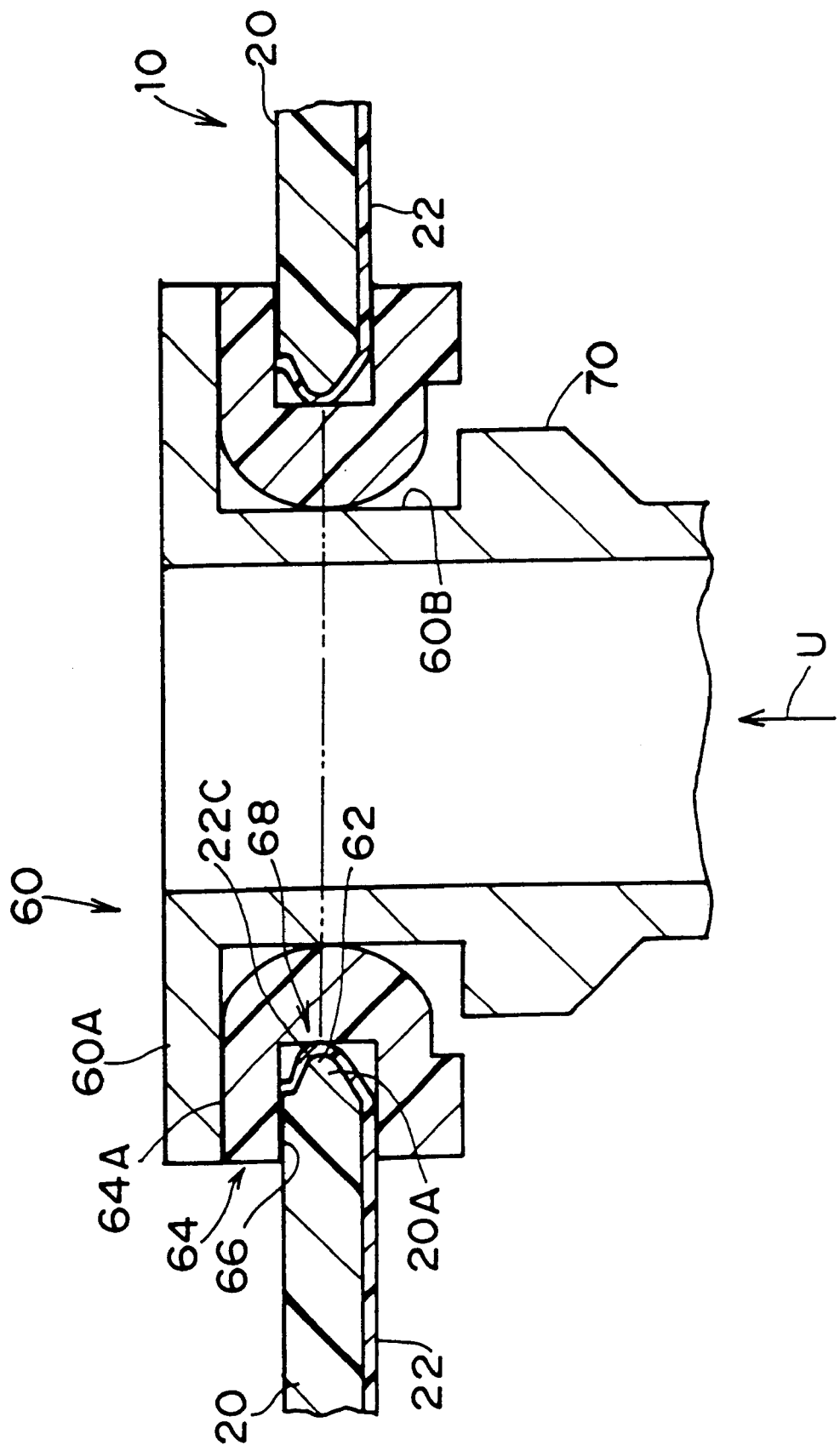
FIG. 5 is a side cross-sectional view which shows a cut-off valve attachment portion at a hollow resin container of a third embodiment of the present invention.

As shown in FIG. 5, a cut-off valve 60, which is a part attached from outside of the container, is mounted on the upper portion of a fuel tank 10 of the third embodiment. When the liquid surface of the fuel within the fuel tank 10 rises up to the position of the cut-off valve 60 due to turning of a vehicle, the cut-off valve 60 is closed.

A flange 60A is formed outwardly at the upper end opening portion of the cut-off valve 60. Further, at the portion connecting with the cut-off valve 60, a part attachment portion 62 having a circular opening is formed so as to protrude from the matrix resin layer 20. The cross-sectional configuration of this part attachment portion 62 is V-shaped. The gas barrier sheet 22 extends to the opening end portion of the part attachment portion 62 along the inner circumferential surface thereof. (The portion of the gas barrier sheet 22 which extends along the part attachment portion 62 of the resin layer 20 is referred to as "gas barrier sheet 22C".)

A ring-shaped gasket 64 is attached to the part attachment portion 62 of the matrix resin layer 20. An upper surface 64A of the gasket 64 abuts the flange 60A of the cut-off valve 60. A ring-shaped concave portion 66 is formed at the outer peripheral portion of the gasket 64. An opening edge portion 20A of the resin layer 20 is fit into this concave portion 66. The cross-sectional configuration of an inner peripheral portion of the gasket 64 is semicircular. The inner peripheral portion of the gasket 64 abuts the outer circumferential portion of a pipe-shaped portion 60B of the cut-off valve 60.

In the third embodiment, a seal portion 68 is formed at the opening edge portion 20A of the resin layer 20. At this seal portion 68, the gasket 64 is nipped between the part attachment portion 62 of the resin layer 20 (the gas barrier sheet 22C) and the pipe-shaped portion 60B of the cut-off valve 60. Accordingly, leakage of liquid does not occur. At the outer circumferential portion of the pipe-shaped portion 60B of the cut-off valve 60, a ring-shaped convex portion 70 is formed at a region which is further toward the inner side of the fuel tank 10 than the seal portion 68. Consequently, removal (movement in the direction of arrow U in FIG. 5) of the cut-off valve 60 from the fuel tank 10 is prevented.

Next, operation of the third embodiment will be explained.

As shown in FIG. 5, in the third embodiment, the seal portion 68 is formed at the depth direction intermediate portion of the part attachment portion 62 of the resin layer 20. The gas barrier sheet 22C extends from this seal portion 68 to a region which is outside of the fuel tank 10, i.e., to the opening end of the part attachment portion 62.

Therefore, in the fuel tank 10 of the third embodiment, unlike the structure illustrated in FIG. 6, there is no region of the inner side surface of the part attachment portion 62 of the resin layer 20 which is not covered by the gas barrier sheet 22. Therefore, sealability at the part attachment portion 62 can improve.

Further, in the fuel tank 10 of the third embodiment, because the gas barrier sheet 22 exists on a mold parting line shown by the double-dashed chain line in FIG. 5 at the time of molding, a parting line is not formed at this region of the resin layer 20.

The present invention has been described in detail hereinbefore with reference to specific embodiments. However, it should be obvious to those skilled in the art that the present invention is not limited to the embodiments and that various other embodiments are possible within the scope of the present invention. For example, in the aforementioned embodiments, an example is described of a case in which the automobile fuel tank 10 is used as a hollow resin container. However, the hollow resin container is not limited to the automobile fuel tank 10, and another hollow resin container may be used. Further, the sheet material is not limited to the gas barrier sheet, and another sheet material may be used. Moreover, the part which is attached from outside of the container is not limited to the inlet hose 16, the pump assembly 40, and the cut-off valve 60, and another part may be used. Still further, although injection molding is effected in the aforementioned embodiments, the present invention may be applied to injection press molding, hot flow stamping molding, and sheet flow stamping molding.

The present invention is a hollow resin container which is formed from a resin, the inner surface of the hollow resin container being covered by a sheet material, and the hollow resin container having a part attachment portion to which an external part can be attached, wherein: the sheet material extends to a region further toward an opening end side of the part attachment portion than a seal portion, which is formed by the part attachment portion and the external part attached to the part attachment portion. Accordingly, a superior effect is achieved in that sealability at the part attachment portion can be improved.

What is claimed is:

1. A tank, comprising:

a hollow resin container having an inner surface;

a sheet covering the inner surface;

a tubular part attachment portion, to which an external part can be attached, extending from the inner surface towards an outer side of the hollow resin container, the part attachment portion comprising:

a base opening end adjacent the inner surface, the base opening end having a projecting portion that projects radially inward of the part attachment portion, and an opening end at a side of the part attachment portion opposite the base opening end; and a sealing member disposed in the part attachment portion between the projecting portion and the opening end portion, wherein the sheet extends beyond the sealing member and terminates at the opening end of the part attachment portion and the external part attached to the part attachment portion.

2. A tank according to claim 1, wherein said sheet material extends to said opening end portion of said part attachment portion.

3. A tank according to claim 1, wherein a flange is provided at said opening end portion of said part attachment portion.

4. A tank according to claim 1, wherein said part attachment portion is cylindrical, and said projecting portion is a ring-shaped projecting portion which projects radially inward at the base end opening portion of the part attachment portion.

* * * * *